(12) United States Patent
Butler et al.

(10) Patent No.: US 9,992,160 B2
(45) Date of Patent: *Jun. 5, 2018

(54) OPTICAL COMMUNICATION SYSTEM TO AUTOMATICALLY CONFIGURE REMOTE OPTICAL NODES (71) Applicant: Sprint Communications Company L.P., Overland Park, KS (US)

(72) Inventors: Robert Keith Butler, Overland Park, KS (US); William Alexander James, Overland Park, KS (US); Lyle T. Bertz, Lee's Summit, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/711,008

(22) Filed: Sep. 21, 2017

(65) Prior Publication Data
US 2018/0013719 A1 Jan. 11, 2018

Related U.S. Application Data (63) Continuation of application No. 15/148,318, filed on May 6, 2016, now Pat. No. 9,832,166.

(51) Int. Cl.
| H04J 14/02 | (2006.01) |
| H04L 29/12 | (2006.01) |
| H04B 10/25 | (2013.01) |
| H04B 10/27 | (2013.01) |
| H04Q 11/00 | (2006.01) |

(52) U.S. Cl.
CPC ........ *H04L 61/2007* (2013.01); *H04B 10/25* (2013.01); *H04B 10/27* (2013.01); *H04J 14/02* (2013.01); *H04L 61/1511* (2013.01); *H04Q 11/0005* (2013.01); *H04Q 2011/0016* (2013.01); *H04Q 2011/0041* (2013.01)

(58) Field of Classification Search
CPC .. H04L 61/2007; H04L 61/1511; H04J 14/02; H04B 10/27; H04B 10/25; H04Q 11/0005; H04Q 2011/0041; H04Q 2011/0016
USPC .......................................................... 398/79
See application file for complete search history.

(56) References Cited

U.S. PATENT DOCUMENTS

| 2004/0190902 A1 | 9/2004 | Tamai |
| 2006/0083251 A1 | 4/2006 | Kataoka et al. |
| 2007/0086364 A1 | 4/2007 | Ellis et al. |
| 2012/0201186 A1 | 8/2012 | Awano |

*Primary Examiner* — Juan A Torres (57) ABSTRACT

An optical Internet Protocol (IP) router serves a cell-site over an optical communication network. The optical IP router transmits a network attach request having an optical node name over a control optical wavelength. The optical communication node receives an assignment of a data optical wavelength, a cell-site mode, and an Internet Protocol (IP) address over the control optical wavelength based on the optical node name. The optical communication node operates in the cell-site mode and responsively exchanges cell-site data having the IP address over the data optical wavelength.

20 Claims, 7 Drawing Sheets

OPTICAL COMMUNICATION SYSTEM TO AUTOMATICALLY CONFIGURE REMOTE OPTICAL NODES

RELATED CASES

This patent application is a continuation of U.S. patent application Ser. No. 15/148,318 that was filed on May 6, 2016 and is entitled "OPTICAL COMMUNICATION SYSTEM TO AUTOMATICALLY CONFIGURE REMOTE OPTICAL NODES." U.S. patent application Ser. No. 15/148,318 is hereby incorporated by reference into this patent application.

TECHNICAL BACKGROUND

Optical networks use signals encoded onto light to transmit information between nodes of a network. Optical networks may use techniques such as, Wavelength-Division Multiplexing (WDM) to multiplex a number of optical signals on a single optical fiber using different wavelengths. However, using WDM to multiplex signals requires additional equipment.

Optical nodes, such as small Form factor Pluggables (SFPs) are relatively inexpensive, compact pluggable transceivers. The SFPs may be tuned to a specified wavelength. By tuning two or more SFPs to the same frequency or wavelength, the SFPs or optical nodes may be paired up to provide point-to-point communication. SFPs may be used to perform routing functions in an optical network. When a new SFP or optical node is added to the optical network, the optical node needs to be configured. A dedicated control channel is not available with the SFP connections and control must be maintained as the wavelengths are tuned.

OVERVIEW

An optical Internet Protocol (IP) router serves a cell-site over an optical communication network. The optical IP router transmits a network attach request having an optical node name over a control optical wavelength. The optical communication node receives an assignment of a data optical wavelength, a cell-site mode, and an Internet Protocol (IP) address over the control optical wavelength based on the optical node name. The optical communication node operates in the cell-site mode and responsively exchanges cell-site data having the IP address over the data optical wavelength.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
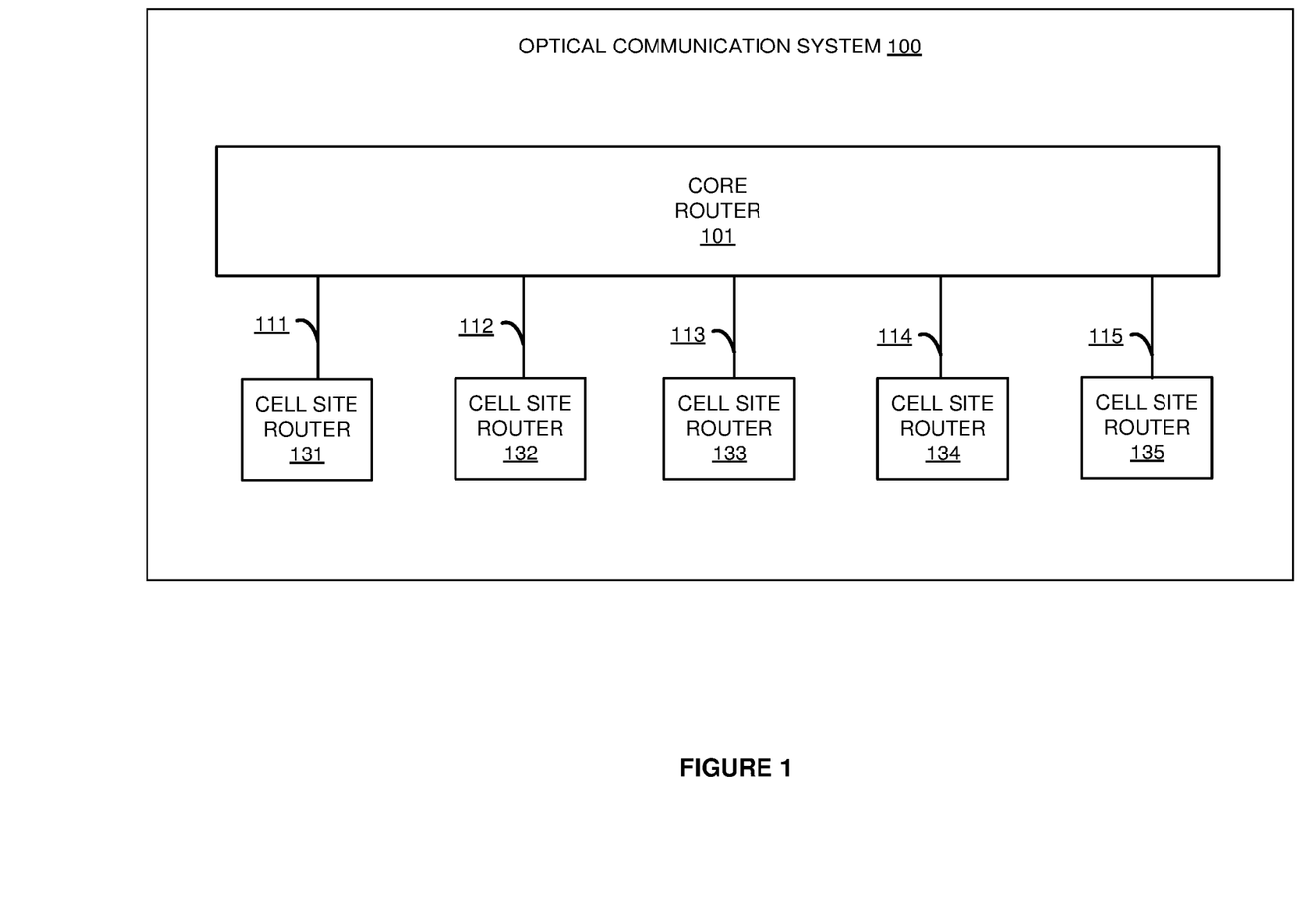
FIG. 1 illustrates an optical communication system to automatically configure remote optical nodes.

FIG. 1 illustrates optical communication system 100 to automatically configure remote optical nodes. Optical communication system 100 includes core router 101 and cell site routers 131-135. Cell site routers 131-135 are examples of remote optical nodes. In some examples cell site routers comprise aggregate routers, base station routers, or other types of remote optical nodes—including combinations thereof. Cell site routers 131-135 and core router 101 communicate over optical links 111-115.

Cell site routers 131-135 may be coupled to the optical network over one, two, four, or some other number of optical fibers. In some examples, optical communication system 100 includes wavelength independent passive optics at cell site routers 131-135 thereby omitting the need for wavelength filters, which are more expensive to deploy and operate.

Optical links 111-115 may represent a single fiber, multiple fibers, or multiple signals multiplexed using a protocol such as WDM. Optical links 111-115 may be tuned to transmit and receive optical signals at different wavelengths. Optical links may use any variety of communication media such as optical fiber or any other signal propagation path, including combinations thereof. Also, optical links 111-115 may use any variety of communication protocols, such as Internet Protocol (IP), telephony, optical networking, or any other communication protocols and formats, including combinations thereof. Further, optical links 111-115 could be direct links or they might include various intermediate components, systems, and networks.

In operation, core router 101 transmits a control optical signal at a control transmit wavelength. Cell site routers 131-135 receive the control optical signal at the control transmit wavelength and transmit an attach request at the control transmit wavelength to core router 101. In some examples, cell site routers will be pre-configured to tune to the control transmit wavelength upon power up. Although not required, cell site routers 131-135 may check for interference before transmitting on the control transmit wavelength.

Core router 101 receives the attach request and assigns an Internet Protocol (IP) address, a data transmit wavelength, and a mode to cell site routers 131-135. In some examples, the mode may comprise core router mode, aggregate router mode, and/or base station router mode. Cell site routers 131-135 tune to the assigned data transmit wavelength and operate in the assigned mode. In some examples, cell site routers 131-135 may be assigned more than one data transmit wavelength. The different data transmit wavelengths may be used to separate communications based on data type or communication flow.

Figure 2:
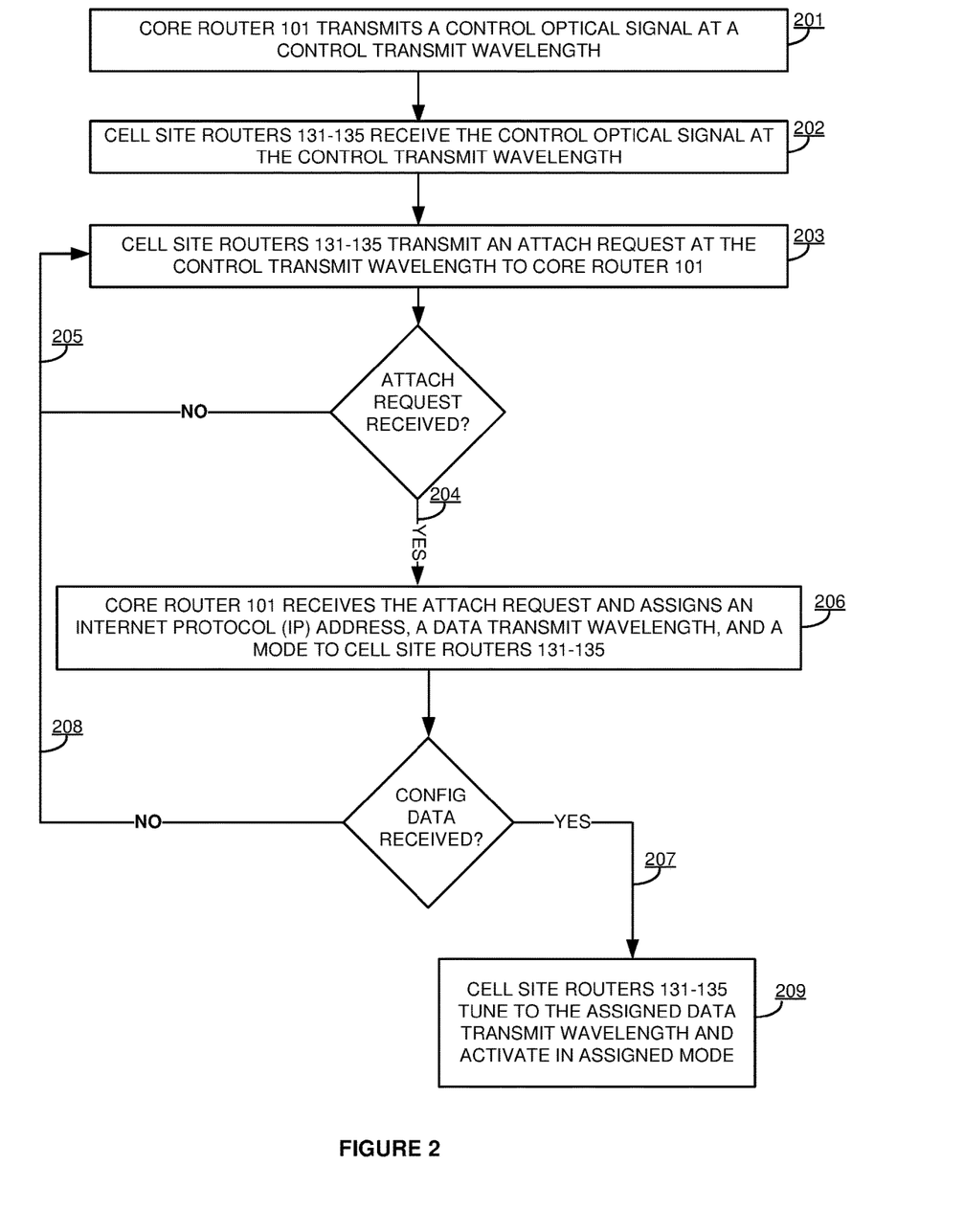
FIG. 2 illustrates the operation of the optical communication system to automatically configure remote optical nodes.

FIG. 2 illustrates the operation of optical communication system 100 to automatically configure cell site routers. Although not required, upon power up, core router 101 may initially be configured using the same method used to configure cell site routers. Core router 101 transmits a control optical signal at a control transmit wavelength (201). Cell site routers 131-135 receive the control optical signal at the control transmit wavelength (202). Although not required, cell site routers 131-135 may be pre-configured to tune to the control transmit wavelength upon powering up for the first time or when there is a need for configuration (e.g. provisioning or de-provisioning nodes).

Cell site routers 131-135 transmit an attach request at the control transmit wavelength to core router 101 (203). In some examples, the attach request may include BIOS data, name, and/or reporting IP address. If core router 101 receives the attach request (204), then core router 101 assigns an IP address, a data transmit wavelength, and a mode to cell site routers 131-135 (206). In some examples, core router 101 may send the name associated with the attach request to a Domain Name Server (DNS) that performs a look-up to determine how to configure the cell site router. If core router 101 does not receive an attach request (205), then core router 101 continues to check for an attach request.

If cell site routers 131-135 receive configuration data (i.e. an IP address, data transmit wavelength, and mode) (207), then cell site routers 131-135 tune to the assigned data transmit wavelength and operate in the assigned mode (209). Cell site routers 131-135 begin transmitting and/or receiving communications at the assigned data transmit wavelength. In the event communication is lost over the assigned data transmit wavelength, cell site routers 131-135 may revert back to the control transmit wavelength in order to be reconfigured. If cell site routers 131-135 do not receive configuration data (208), then another attach request may be sent.

Figure 3:
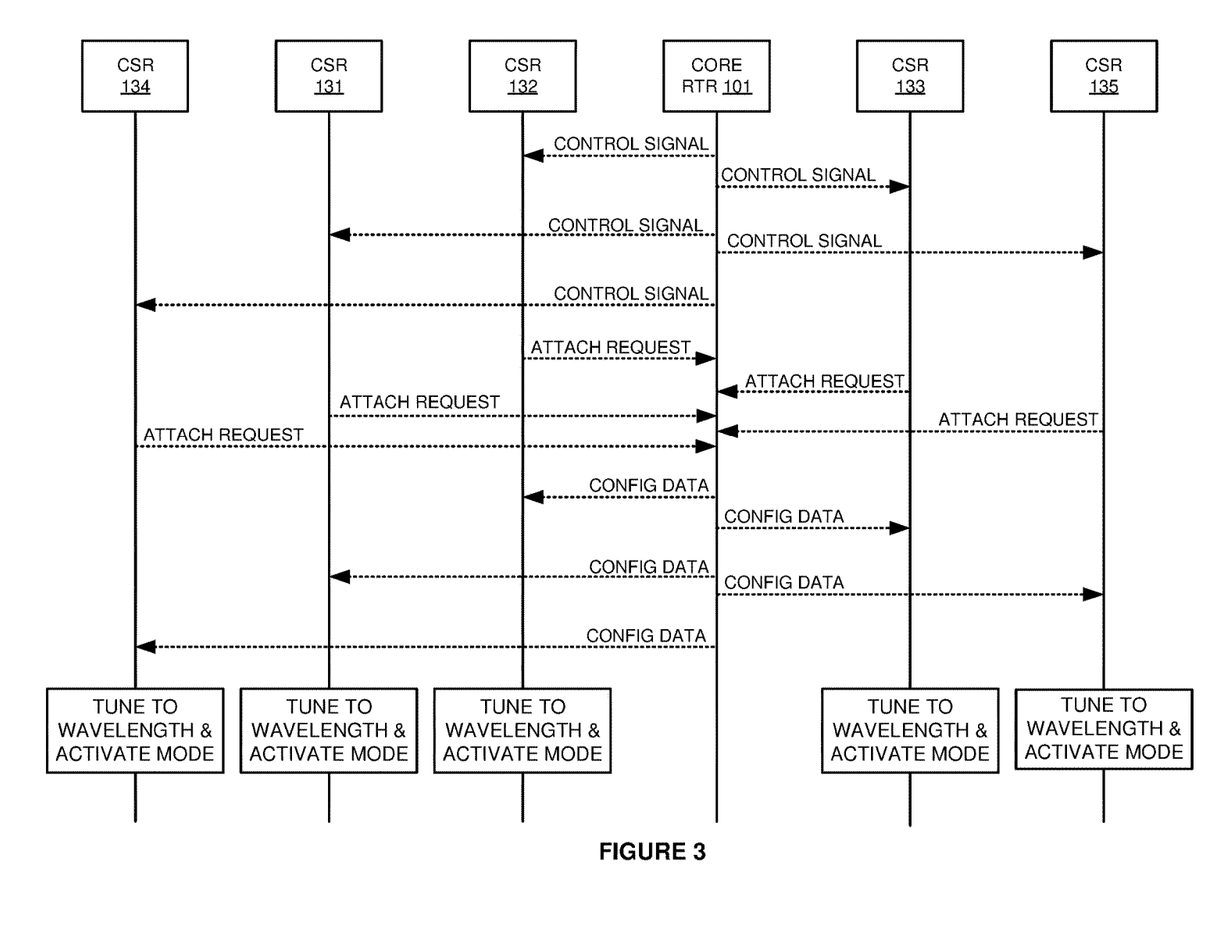
FIG. 3 illustrates the operation of the optical communication system to automatically configure remote optical nodes.

FIG. 3 illustrates the operation of optical communication system 100 to automatically configure cell site routers. Core router 101 transmits a control optical signal at a control transmit wavelength. Cell site routers 131-135 receive the control optical signal at the control transmit wavelength and transmit an attach request at the control transmit wavelength to core router 101. Core router 101 receives the attach request and assigns an IP address, a data transmit wavelength, and a mode to cell site routers 131-135. Cell site routers 131-135 tune to the assigned data transmit wavelength and operate in the assigned mode. In some examples, cell site routers 131-135 may maintain a connection to core router 101 over the control transmit wavelength. The connection may be used to re-provision the remote optical node. Although not required, cell site routers 131-135 may each be assigned multiple IP addresses or data transmit wavelengths in order to separate communication flows. In some examples, communication flows may be separated by data type.

Figure 4:
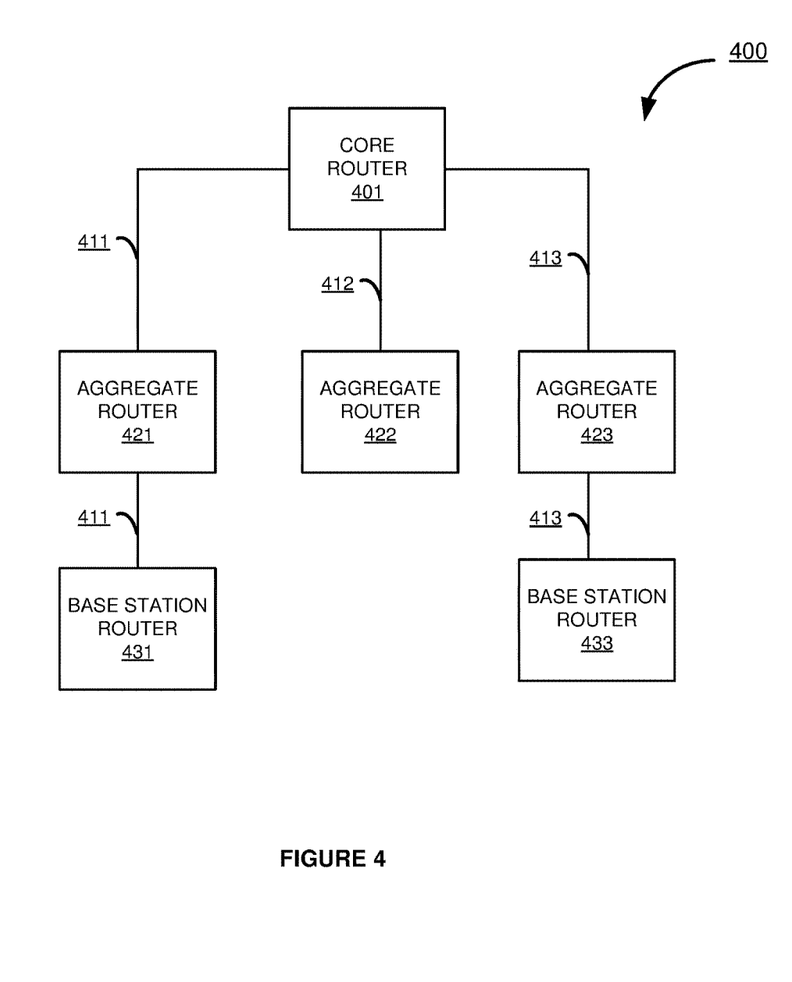
FIG. 4 illustrates an optical communication system to automatically configure remote optical nodes.

FIG. 4 illustrates optical communication system 400 to automatically configure remote optical nodes. Optical communication system 400 includes core router 401, aggregate routers 421-423, and base station routers 431 and 433. Optical link 411 connects core router 401, aggregate router 421, and base station router 431. Core router 401 and aggregate router 422 communication over optical link 412. Optical link 413 connects core router 401, aggregate router 423, and base station router 433.

In operation, core router 401 transmits a control optical signal at a control transmit wavelength. Aggregate routers 421-423 receive the control optical signal at the control transmit wavelength and transmit an aggregate attach request at the control transmit wavelength to core router 401. Core router 401 receives the aggregate attach requests and assigns an IP address, attach transmit wavelength, and mode to aggregate routers 421-423.

Aggregate routers 421-423 tune to the assigned attach transmit wavelength and operate in aggregate mode. Although not required, aggregate routers may use a different port(s) to transmit and receive at the assigned attach transmit wavelength and continue to transmit and receive at the control transmit wavelength. Aggregate routers 421-423 transmit an attach optical signal at the attach transmit wavelength.

Base station routers 431 and 433 receive the attach optical signal at the attach transmit wavelength and transmit a base station attach request at the attach transmit wavelength to aggregate routers 421-423. Aggregate routers 421-423 transmit the base station attach request to core router 401. In some examples, base station routers 431 and 433 may be tuned to the control transmit wavelength and transfer the base station attach request directly to core router 401 over the control transmit wavelength.

Core router 401 receives the base station attach request and assigns an IP address, data transmit wavelength, and mode to base station routers 431 and 433. In some examples, aggregate routers 421 and 423 may receive the base station attach request and assign an IP address, transmit signal wavelength, and mode to base station routers 431 and 433, without forwarding the base station attach requests to core router 401.

Base station routers 431 and 433 tune to the assigned data transmit wavelength and operate in base station mode. In some examples, the data transmit wavelength creates a backhaul connection between the base station router and the core network. Although not required, the data transmit wavelength may create an X2 link between two base station routers.

The backhaul connection may be used to report SFP health, XPort health, available wavelengths, etc. For example, core router 401 may send new configuration data to base station routers 431 and 433 over the backhaul link. New configuration data may be sent in response to a user instruction to reconfigure the network or de-provision nodes based on network load data. In some examples, the optical network automatically reconfigures optical nodes based on network data.

Figure 5:
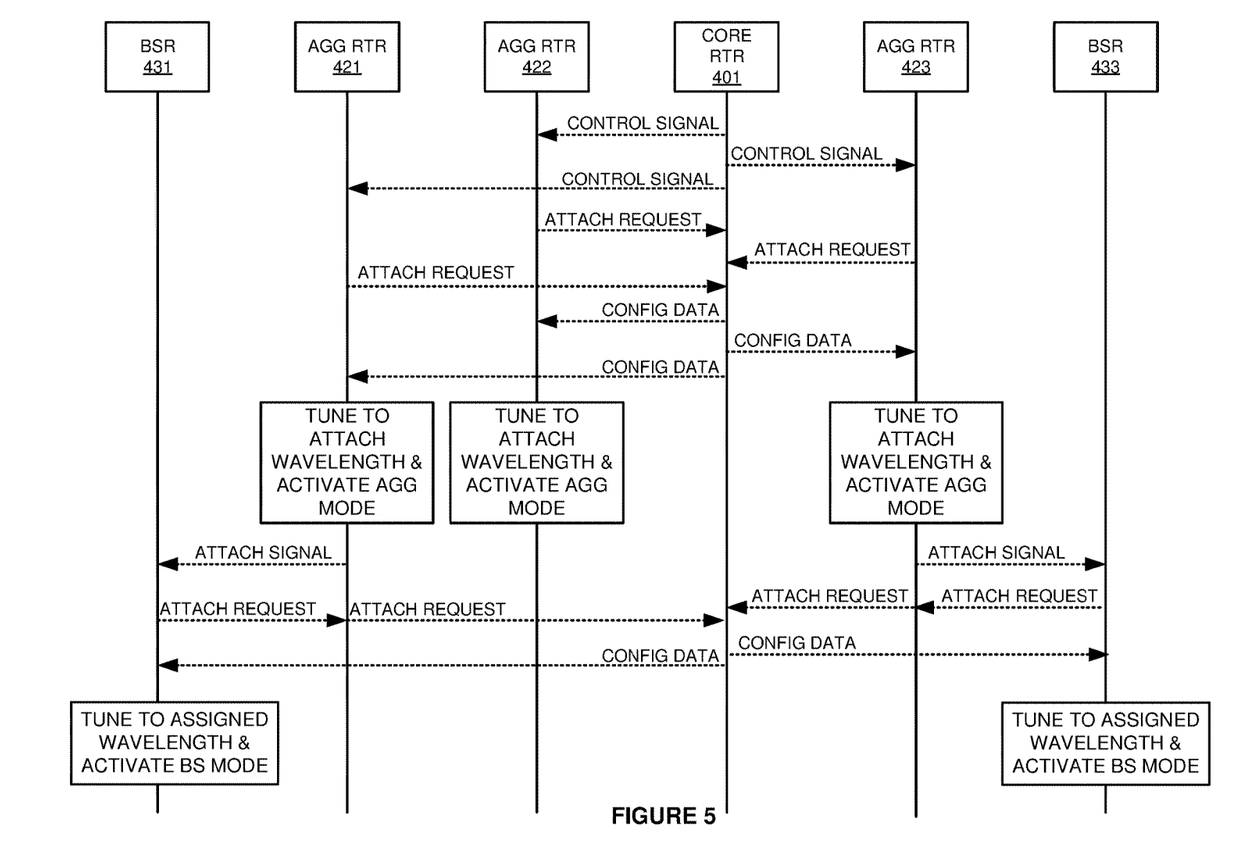
FIG. 5 illustrates the operation of the optical communication system to automatically configure remote optical nodes.

FIG. 5 illustrates the operation of optical communication system 400 to automatically configure optical router nodes. Core router 401 transmits a control optical signal at a control transmit wavelength. Aggregate routers 421-423 receive the control optical signal at the control transmit wavelength transmitted from core router 401. For example, aggregate routers 421-423 may be pre-configured to tune to the control transmit wavelength.

Aggregate routers 421-423 transmit an aggregate attach request at the control transmit wavelength to core router 401. Core router 401 receives the aggregate attach requests and assigns an IP address, attach transmit wavelength, and mode to aggregate routers 421-423. Aggregate routers 421-423 tune to the assigned attach transmit wavelength and operate in aggregate mode. Aggregate routers 421-423 transmit an attach optical signal at the attach transmit wavelength.

Base station routers 431 and 433 receive the attach optical signal at the attach transmit wavelength transmitted from aggregate routers 421-423. In some examples, base station routers 431 and 433 may be pre-configured to tune to the attach transmit wavelength. Base station routers 431 and 433 transmit a base station attach request at the attach transmit wavelength to aggregate routers 421-423. Aggregate routers 421-423 transmit the base station attach request to core router 401. Core router 401 receives the base station attach request and assigns an IP address, data transmit wavelength, and mode to base station routers 431 and 433. Base station routers 431 and 433 tune to the assigned data transmit wavelength and operate in base station mode.

Figure 6:
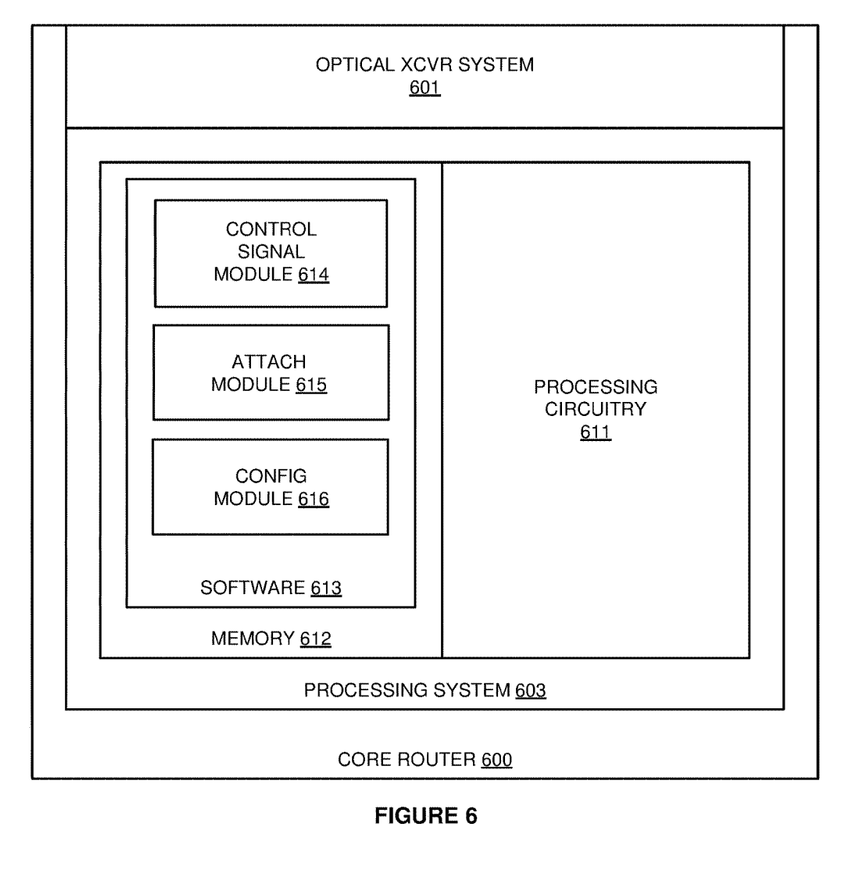
FIG. 6 illustrates an example of a core router.

FIG. 6 illustrates core router 600. Core router 600 is an example of core router 101 and core router 401, although core router 101 and core router 401 may use alternative configurations. Core router 600 comprises optical transceiver system 601 and processing system 603. Processing system 603 includes processing circuitry 611 and memory 612 that stores operating software 613.

Optical transceiver system 601 comprises components that communicate over communication links, such as network cards, ports, optical transceivers, processing circuitry and software, or some other communication devices. Optical transceiver system 601 may be configured to communicate over fiber or optical links. Optical transceiver system 601 may be configured to use WDM, TDM, IP, Ethernet, optical networking, wireless protocols, communication signaling, or some other communication format—including combinations thereof.

Processing circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus.

Software 613 comprises computer programs, firmware, or some other form of machine-readable processing instructions. Software 613 may include an operating system, utilities, drivers, network interfaces, applications, or some other type of software. In this example, software 613 comprises control signal module 614, attach module 615, and configuration ("config") module 616. Although software 613 could have alternative configurations in other examples.

Software 613 may be implemented in program instructions and may be executed by processing system 603. Software 613 may include additional processes, programs, or components, such as operating system software, database software, or application software—including combinations thereof. Software 613 may also comprise firmware or some other form of machine-readable processing instructions executable by processing system 603. When executed by processing circuitry 611, software 613 directs processing system 603 to operate core router 600 as described herein.

In particular, control signal module 614 directs processing system 603 to transmit a control optical signal at a control transmit wavelength. Attach module 615 directs processing system 603 to process attach requests. Config module 616 directs processing system 603 to determine and transmit configuration data (i.e. assigned IP address, assigned wavelength, and mode).

Figure 7:
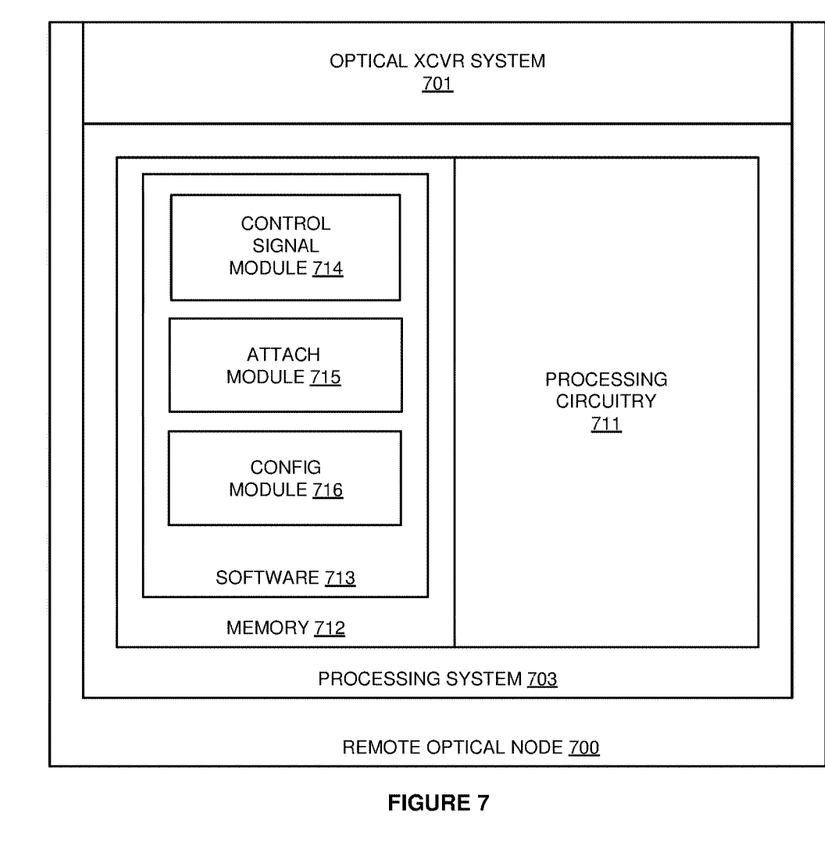
FIG. 7 illustrates an example of a remote optical node.

FIG. 7 illustrates remote optical node 700. Remote optical node 700 is an example of cell site routers 131-135, aggregate routers 421-423, and base station routers 431 and 433, although cell site routers 131-135, aggregate routers 421-423, and base station routers 431 and 433 may use alternative configurations. Remote optical node 700 comprises optical transceiver system 701 and processing system 703. Processing system 703 includes processing circuitry 711 and memory 712 that stores operating software 713.

Optical transceiver system 701 comprises components that communicate over communication links, such as network cards, ports, optical transceivers, processing circuitry and software, or some other communication devices. Optical transceiver system 701 may be configured to communicate over metallic, wireless, or optical links. Optical transceiver system 701 may be configured to use WDM, TDM, IP, Ethernet, optical networking, wireless protocols, communication signaling, or some other communication format—including combinations thereof.

Processing circuitry 711 comprises microprocessor and other circuitry that retrieves and executes operating software 713 from memory 712. Memory 712 comprises a non-transitory storage medium, such as a disk drive, flash drive, data storage circuitry, or some other memory apparatus.

Software 713 comprises computer programs, firmware, or some other form of machine-readable processing instructions. Software 713 may include an operating system, utilities, drivers, network interfaces, applications, or some other type of software. In this example, software 713 comprises control signal module 714, attach module 715, and configuration ("config") module 716. Although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703. When executed by processing circuitry 711, software 713 directs processing system 703 to operate remote optical node 700 as described herein.

In particular, control signal module 714 directs processing system 703 to scan for a control optical signal at a control transmit wavelength. Attach module 715 directs processing system 703 to transfer an attach request at the control transmit wavelength. Configuration module 716 directs processing system 703 to tune remote optical node to the assigned wavelength and activate in the assigned mode The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an optical Internet Protocol (IP) router to serve a cell-site over an optical communication network, the method comprising:
   the optical IP router transmitting a network attach request having an optical node name over a control optical wavelength;
   the optical communication node receiving an assignment of a data optical wavelength, a cell-site mode, and an Internet Protocol (IP) address over the control optical wavelength based on the optical node name; and
   the optical communication node operating in the cell-site mode and responsively exchanging cell-site data having the IP address over the data optical wavelength.

2. The method of claim 1 wherein the data optical wavelength comprises an optical IP connection to another cell site.

3. The method of claim 1 wherein the data optical wavelength comprises an X2 connection to another cell site.

4. The method of claim 1 wherein the data optical wavelength comprises an optical IP connection to an aggregation network node.

5. The method of claim 1 wherein the data optical wavelength comprises an optical IP connection to a core network node.

6. The method of claim 1 wherein the optical IP router transmitting and receiving over the control optical wavelength and the data optical wavelength comprises the optical IP router using Wave Division Multiplexing (WDM).

7. The method of claim 1 further comprising:
   the optical IP router receiving an assignment of additional data optical wavelengths over the control optical wavelength based on the optical node name; and
   the optical IP router responsively exchanging additional cell-site data over the additional data optical wavelengths.

8. The method of claim 1 further comprising:
   the optical IP router receiving an assignment of additional IP addresses over the control optical wavelength based on the optical node name; and
   the optical IP router responsively exchanging additional cell-site data having the additional IP addresses.

9. The method of claim 1 further comprising:
   the optical IP router receiving an assignment of additional data optical wavelengths and additional IP addresses over the control optical wavelength based on the optical node name; and
   the optical IP router responsively exchanging additional cell-site data having the additional IP addresses over the additional data optical wavelengths.

10. The method of claim 1 further comprising the optical IP router receiving a power signal and wherein the optical IP router transmitting the network attach request having the optical node name over the control optical wavelength comprises the optical IP router transmitting the network attach request in response to receiving the power signal.

11. An optical Internet Protocol (IP) router to serve a cell-site over an optical communication network comprising:
   an optical transceiver system configured to transmit and receive over a control optical wavelength and over a data optical wavelength; and
   a data processing system that is coupled to the optical transceiver system and that has processing circuitry and data memory configured to transmit a network attach request having an optical node name over the control optical wavelength, receive an assignment of the data optical wavelength, a cell-site mode, and an Internet Protocol (IP) address over the control optical wavelength based on the optical node name, operate in the cell-site mode, and responsively exchange cell-site data having the IP address over the data optical wavelength.

12. The optical IP router of claim 11 wherein the data optical wavelength comprises an optical IP connection to another cell site.

13. The optical IP router of claim 11 wherein the data optical wavelength comprises an X2 connection to another cell site.

14. The optical IP router of claim 11 wherein the data optical wavelength comprises an optical IP connection to an aggregation network node.

15. The optical IP router of claim 11 wherein the data optical wavelength comprises an optical IP connection to a core network node.

16. The optical IP router of claim 11 wherein the optical transceiver system is configured to use Wave Division Multiplexing (WDM) to transmit and receive over the control optical wavelength and the data optical wavelength.

17. The optical IP router of claim 11 wherein the data processing system is configured to receive an assignment of additional data optical wavelengths over the control optical wavelength based on the optical node name and responsively exchange additional cell-site data over the additional data optical wavelengths.

18. The optical IP router of claim 11 wherein the data processing system is configured to receive an assignment of additional IP addresses over the control optical wavelength based on the optical node name and responsively exchanging additional cell-site data having the additional IP addresses.

19. The optical IP router of claim 11 wherein the data processing system is configured to receive an assignment of additional data optical wavelengths and additional IP addresses over the control optical wavelength based on the optical node name and responsively exchanging additional cell-site data having the additional IP addresses over the additional data optical wavelengths.

20. The optical IP router of claim 11 wherein the data processing system is configured to receive a power signal and wherein transmitting the network attach request having the optical node name over the control optical wavelength comprises transmitting the network attach request in response to receiving the power signal.

* * * * *